United States Patent
Chen

(10) Patent No.: US 11,042,215 B2
(45) Date of Patent: Jun. 22, 2021

(54) IMAGE PROCESSING METHOD AND APPARATUS, STORAGE MEDIUM, AND ELECTRONIC DEVICE

(71) Applicant: GUANGDONG OPPO MOBILE TELECOMMUNICATIONS CORP., LTD., Guangdong (CN)

(72) Inventor: Yan Chen, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/581,688

(22) Filed: Sep. 24, 2019

(65) Prior Publication Data

US 2020/0097070 A1    Mar. 26, 2020

(30) Foreign Application Priority Data

Sep. 25, 2018 (CN) .......................... 201811116995.2

(51) Int. Cl.
   *G06F 3/01* (2006.01)
   *A63F 13/213* (2014.01)
   *G06K 9/00* (2006.01)

(52) U.S. Cl.
   CPC ............ *G06F 3/011* (2013.01); *A63F 13/213* (2014.09); *G06F 3/017* (2013.01); *G06K 9/00342* (2013.01); *G06K 9/00369* (2013.01)

(58) Field of Classification Search
   CPC ........ G06F 3/011; G06F 3/017; A63F 13/213; A63F 13/428; G06K 9/00342; G06K 9/00369; G06K 9/00362; G06T 2207/20084; G06T 2207/30196;
   (Continued)

(56) References Cited

U.S. PATENT DOCUMENTS

| 2004/0155962 A1 * | 8/2004 | Marks ...................... G06T 7/50 348/169 |
| 2010/0215271 A1 * | 8/2010 | Dariush ............... G06K 9/4671 382/180 |

(Continued)

FOREIGN PATENT DOCUMENTS

| CN | 103473801 A | 12/2013 |
| CN | 107469355 A | 12/2017 |

(Continued)

OTHER PUBLICATIONS

The international search report and written opinion for the international PCT application No. PCT/CN2019/107957, dated Dec. 31, 2019.

(Continued)

*Primary Examiner* — Brent D Castiaux
(74) *Attorney, Agent, or Firm* — Ladas & Parry, LLP

(57) ABSTRACT

Provided are an image processing method and apparatus, a storage medium and an electronic device. In the embodiments of the present application, a human body image is acquired; the human body image is analyzed to identify human body feature point information corresponding to the human body image; the human body feature point information is combined to generate human body model information; and a virtual object is correspondingly controlled according to the human body model information.

18 Claims, 4 Drawing Sheets

(58) Field of Classification Search
CPC ... G06T 2207/10024; G06T 7/75; G06T 7/74; G06T 17/00; G06T 19/006
See application file for complete search history.

(56) References Cited

U.S. PATENT DOCUMENTS

| | | | | |
|---|---|---|---|---|
| 2010/0303289 | A1* | 12/2010 | Polzin | A63F 13/428 382/103 |
| 2013/0171601 | A1* | 7/2013 | Yuasa | A61B 5/744 434/258 |
| 2017/0330384 | A1* | 11/2017 | Liu | G06T 19/20 |
| 2019/0188876 | A1* | 6/2019 | Song | G06T 7/70 |

FOREIGN PATENT DOCUMENTS

| | | |
|---|---|---|
| CN | 108305312 A | 7/2018 |
| CN | 108416258 A | 8/2018 |
| CN | 109325450 A | 2/2019 |
| JP | 2007323341 A | 12/2007 |

OTHER PUBLICATIONS

The extended European Search Report for the EP patent application No. 19199571.1, dated Feb. 27, 2020.
Mori G et al: "Recovering 3D Human Body Configurations Using Shape Contexts", IEEE Transactions on Pattern Anylysis and Machine Intelligence, IEEE Computer Society, USA, vol. 28, No. 7, Jul. 1, 2006 (Jul. 1, 2006), pp. 1052-1062, XP001523468, ISSN: 0162-8828, DOI: 10.1109/tPAMI. 2006.149.
Cao Zhe et al: "Realtime Multi-person 2D Pose Estimation Using Part Affinity Fields", IEEE Computer Society Conference on Computer Vision and Patter Recognition. Proceedings, IEEE Computer Society, US, Jul. 21, 2017 (Jul. 21, 2017), pp. 1302-1310, XP033249469, ISSN: 1063-6919, DOI: 10.1109/CVPR.2017.143.
The Communication pursuant to Article 94(3) EPC of the corresponding EP patent application No. 19199571.1, dated Mar. 30, 2021.

* cited by examiner

IMAGE PROCESSING METHOD AND APPARATUS, STORAGE MEDIUM, AND ELECTRONIC DEVICE

CROSS-REFERENCE TO RELATED APPLICATIONS

The present disclosure claims benefit to Chinese Patent Application No. 201811116995.2, filed on Sep. 25, 2018 and entitled "Image Processing Method and Apparatus, Storage Medium, and Electronic Device", the contents of which are hereby incorporated by reference in its entirety.

TECHNICAL FIELD

The present application relates to the technical field of image processing, and in particular, to an image processing method and apparatus, a storage medium and an electronic device.

BACKGROUND

With the continuous development of electronic technologies, electronic devices such as mobile phones are becoming more and more powerful in functionality, and users can install a variety of applications on mobile phones, such as video applications, instant messaging applications, and game applications.

At present, game applications are increasingly focusing on human-computer interaction, for example, a smart wearable device can capture an action contour of a user to control a specific character in a mobile game. However, a mobile phone needs to connect the smart wearable device every time the game is played, and the human-computer interaction process is cumbersome and costly.

SUMMARY

The embodiments of the present application provide an image processing method and apparatus, a storage medium and an electronic device, which can save the cost of human-computer interaction and improve the convenience of human-computer interaction.

According to a first aspect, the embodiments of the present application provide an image processing method, which may include the operations as follows.

A human body image is acquired.

The human body image is analyzed to identify human body feature point information corresponding to the human body image.

The human body feature point information is combined to generate human body model information.

A virtual object is correspondingly controlled according to the human body model information.

According to a second aspect, the embodiments of the present application provide an image processing apparatus, which may include:
  an acquisition unit, configured to acquire a human body image;
  an analysis unit, configured to analyze the human body image to identify human body feature point information corresponding to the human body image;
  a combination unit, configured to combine the human body feature point information to generate human body model information; and
  a control unit, configured to correspondingly control a virtual object according to the human body model information.

According to a third aspect, the embodiments of the present application provide a storage medium, having a computer program stored thereon. When the computer program is run on a computer, the computer is enabled to perform the image processing method provided according to any embodiment of the present application.

According to a fourth aspect, the embodiments of the present application provide an electronic device, which may include a memory and a processor. The memory may store a computer program. The computer program may be called by the processor to perform the image processing method provided according to any embodiment of the present application.

In the embodiments of the present application, a human body image is acquired; the human body image is analyzed to identify human body feature point information corresponding to the human body image; the human body feature point information is combined to generate human body model information; and a virtual object is correspondingly controlled according to the human body model information. In this way, human body feature point information in a human body image can be identified in real time, the identified human body feature point information is combined to generate human body model information, and a virtual object is correspondingly controlled according to the state of at least one human body part in the generated human body model information. The cost of human-computer interaction is saved, and the convenience of human-computer interaction is improved.

BRIEF DESCRIPTION OF THE DRAWINGS

The technical solutions of the present application and the beneficial effects thereof will be apparent from the following detailed description of the Detailed Description of the Embodiments in conjunction with the drawings.

DETAILED DESCRIPTION OF THE EMBODIMENTS

Figure 1:
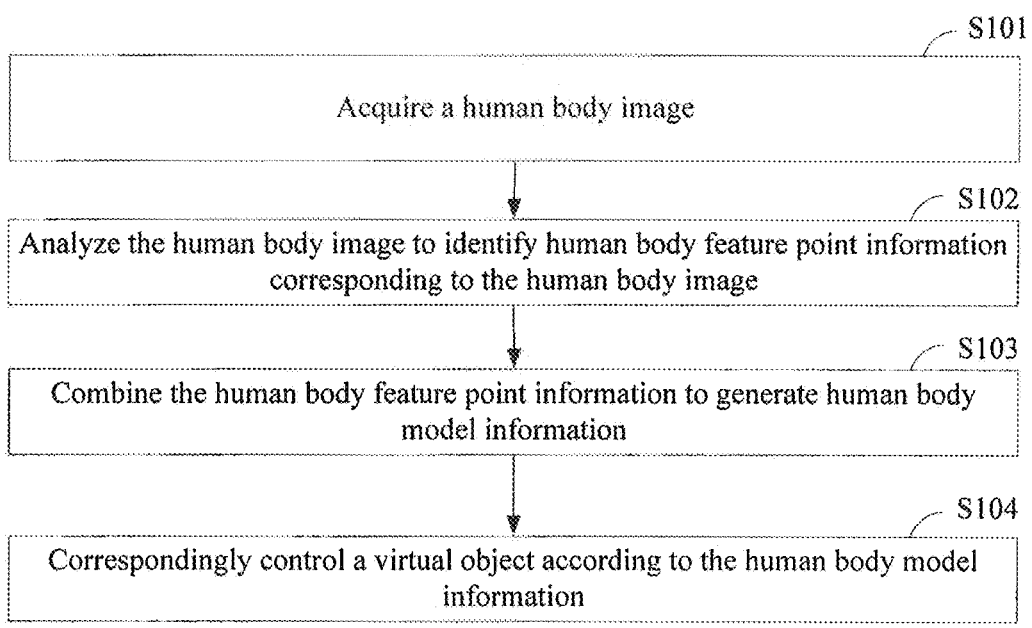
FIG. 1 is a schematic flowchart of an image processing method according to an embodiment of the, present application.

In the drawings, the same reference numerals represent the same components. The principles of the present application are illustrated by taking the implementation in a suitable operation environment as an example. The following description is based on the exemplary embodiments of the present application, and is not to be construed as excluding the existence of other exemplary embodiments of the present application not detailed herein.

The term "module" as used herein may be seen as a software object that is executed on the computing system. Different components, modules, engines, and services described herein may be considered as implementation objects on the computing system. The apparatus and method described herein are preferably implemented by software, and may also be implemented by hardware, all of which are within the scope of the present application.

The embodiments of the present application provide an image processing method. An executive body of the image processing method may be an image processing apparatus provided by the embodiments of the present application, or an electronic device integrated with the image processing apparatus. The image processing apparatus may be implemented in a manner of hardware or software. The electronic device may be a smart phone, a tablet computer, a Personal Digital Assistant (PDA), or the like.

The following is a detailed analysis and description.

An embodiment of the present application provides an image processing method. As shown in FIG. 1, FIG. 1 is a schematic flowchart of an image processing method according to an embodiment of the present application. The image processing method may include the operations as follows.

In operation S101, a human body image is acquired.

An electronic device may capture a current image in real time by calling a camera assembly, and may perform contour analysis on the current image. Since a human body generally has multiple pieces of contour information, such as face contour information and joint contour information, multiple pieces of contour information may be identified. Based on the combination of the multiple pieces of contour information, the human body image in the current image can be determined and then cropped from the current image.

It should be noted that the captured current image and the human body image may be in a format such as a BitMaP (BMP), a Joint Photographic Expert Group (JPEG), or the like.

In some implementation modes, the operation acquiring the human body image may include the following two operations.

(1) An image to be identified is acquired by a camera assembly.

(2) Human body analysis is performed on the image to be identified to obtain the human body image in the image to be identified.

The electronic device may acquire, by calling a camera assembly, a current image to be identified. The camera assembly may include a front camera and/or a rear camera, and the user may determine whether to use the front camera or the rear camera as needed.

Further, pattern features included in the human body image are rich in mode features such as histogram features, color features, template features, structural features, and Haar features (Haar features are features reflecting the change of gray scale of an image and are determined by calculating the differences between pixels in different regions). Therefore, after acquiring the current image to be identified, feature scanning analysis can be performed on the image to be identified, and the human body image in the image to be identified can be determined and cropped from the image to be identified.

In operation S102, the human body image is analyzed to identify human body feature point information corresponding to the human body image.

It should be noted that images for the feature points (such as the head, neck, shoulders, elbows, wrists, waist, knees, and ankles) on the human body have certain line features and contour features.

The lines and contours of the human body image may be scanned and analyzed, multiple feature points with certain features are determined, feature point similarity matching is performed on the feature points and the human body feature point information, and the feature points for which the feature point similarity is higher than a certain threshold are determined as the corresponding human body feature point information.

In some implementation modes, the operation of analyzing the human body image to identify the human body feature point information corresponding to the human body image may be implemented in the following manner. Image elements in the human body image are analyzed by a preset learning model to identify the human body feature point information in the human body image.

The preset learning model may be a mobilenet-Openpose model, which can detect that the captured image is a human body image and identify the human body feature point information from the human body image. The human body feature point information may be understood as information about parts of the human body which have physical characteristics, so that a human body framework model can be formed according to the human feature point information later.

In some implementation modes, the operation of analyzing the image elements in the human body image by the preset learning model to identify the human body feature point information in the human body image may include the following operations.

(1) Lines and contours in the human body image are scanned by the preset learning model to obtain the image elements.

(2) Feature analysis is performed on the image elements to identify the human body feature point information in the human body image, wherein the human body feature point information includes feature point information at one or more of the following positions: head, neck, left shoulder, left elbow, left wrist, left waist, left knee, left ankle, right shoulder, right elbow, right wrist, right waist, right knee, and right ankle.

The mobilenet-Openpose model may be used to scan lines and contours in the human body image to identify image elements in the human body image. The image elements may be used by the electronic device to identify the feature point information. Smart feature analysis may be performed on each image element to identify important human body feature point information. The important human body feature point information may include feature point information at one or more of the following positions: head, neck, left shoulder, left elbow, left wrist, left waist, left knee, left ankle, right shoulder, right elbow, right wrist, right waist, right knee, and right ankle.

In operation S103, the human body feature point information is combined to generate human body model information.

The human body model information is a human body skeleton model. The human body model information, i.e., human body skeleton information, can be obtained by sequentially connecting the identified human body feature information according to a basic human body construction rule. The human body model information reflects a body gesture of the photographed user. In an implementation mode, the human body model information may be a 3D matchstick men model. The 3D matchstick men model can reflect the body posture of the user.

In some implementation modes, the operation of combining the human body feature point information to generate the human body model information may be implemented in the following manner. The human body feature point information is sequentially connected according to a preset human body construction rule to generate the human body model information.

The preset human body construction rule may be embodied as follows. According to the basic structure of a human body, the brain is a combination of the head and the neck, the body is a combination of the shoulder and the waist, the hand is a combination of the shoulder, the elbow and the wrist, and the leg is a combination of the waist, the knee and the ankle. Based on the above rule, sequential construction is performed, and finally the brain, the body, the hand and the leg are integrated to form the human body model information. The formed human body model information can reflect the posture state information of the user.

In operation S104, a virtual object is correspondingly controlled according to the human body model information.

The virtual abject may be a fictitious character. The virtual object is modeled also according to a construction rule of the human body model information, that is, the virtual object may have a mutual correspondence with the human body feature point information corresponding to the human body model information. The virtual object may be a character in a game application.

Further, the body parts of the human body model information may be tracked, for example, the posture angles of the head, the body, the hands and the feet may be tracked to determine the corresponding motion posture, such as squatting, jumping, or waving. The virtual object is controlled to make a corresponding action according to the determined motion posture.

In some implementation modes, the operation of correspondingly controlling the virtual object according to the human body model information may include the following operations.

(1) Position information corresponding to at least one human body part in the human body model information is acquired.

(2) The virtual object is correspondingly controlled according to the position information.

The at least one human body part may be the brain, the body, the hands, and the legs of the human body. The electronic device determines the corresponding motion posture according to the position information of the brain, body, hands and legs of the human body in the human body model information, that is, the position information of each part in the human body model information. For example, a squatting posture with corresponding amplitude can be determined based on the position information of the legs, and the virtual object can be controlled to perform the squatting posture with the corresponding amplitude, thereby achieving the effect of real-time human-computer interaction.

It can be seen from the above that according to the image processing method provided by the embodiments, a human body image is acquired; the human body image is analyzed to identify human body feature point information corresponding to the human body image; the human body feature point information is combined to generate human body model information; and a virtual object is correspondingly controlled according to the human body model information. In this way, human body feature point information in a human body image can be identified in real time, the identified human body feature point information is combined to generate human body model information, and a virtual object is correspondingly controlled according to the state of at least one human body part in the generated human body model information. The cost of human-computer interaction is saved, and the convenience of human-computer interaction is improved.

According to the method described in the above embodiments, further description will be given below based on some examples.

Figure 2:
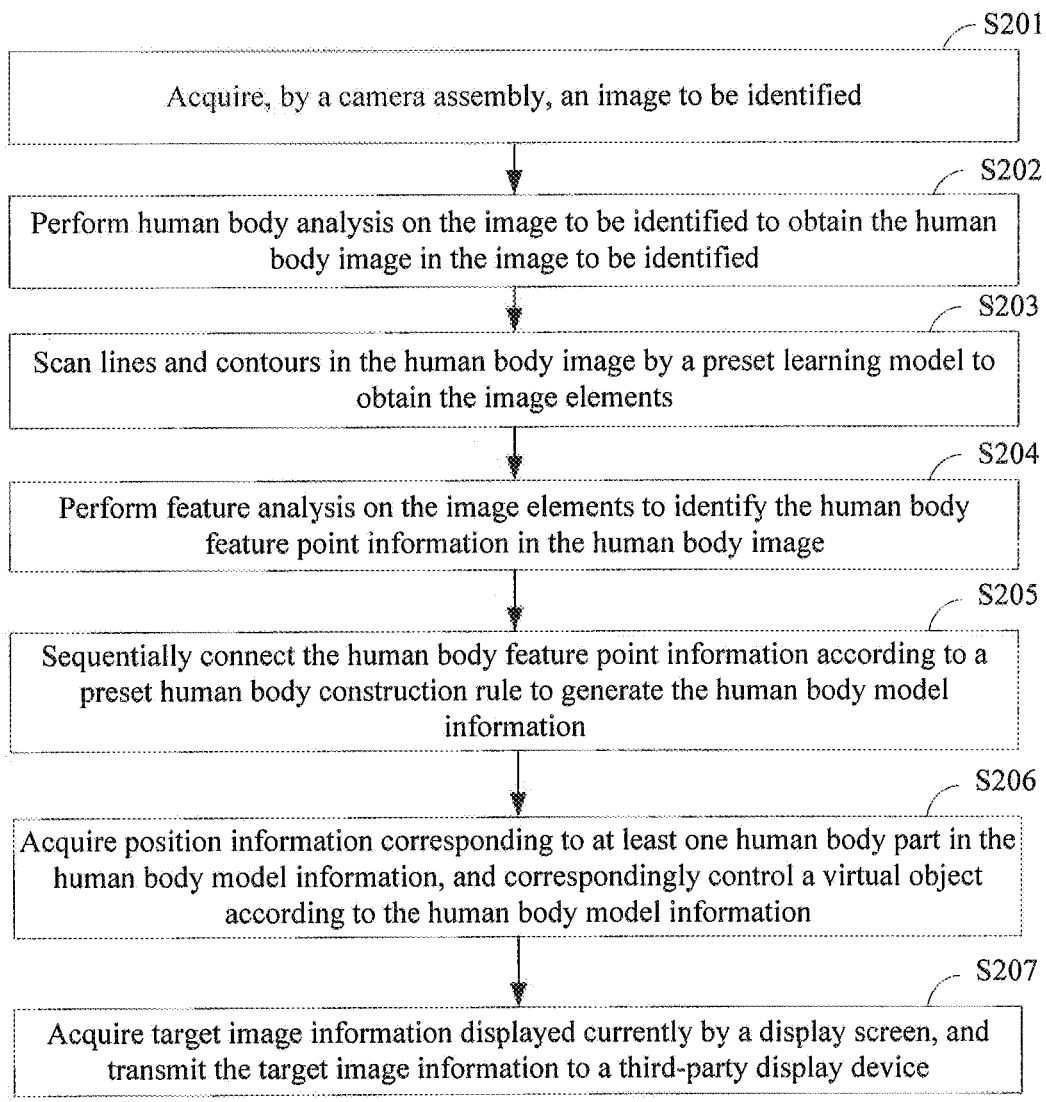
FIG. 2 is another schematic flowchart of an image processing method according to an embodiment of the present application.

Referring to FIG. 2, FIG. 2 is another schematic flowchart of an image processing method according to an embodiment of the present application.

The method includes the operations as follows.

In operation S201, an image to be identified is acquired by a camera assembly.

The electronic device may capture, by using a camera assembly, a current image to be identified in real time. The camera assembly may be a front camera and/or a rear camera, and a user may freely select the front camera and/or the rear camera according to a capture requirement.

In operation S202, human body analysis is performed on the image to be identified to obtain the human body image in the image to be identified.

Pattern features included in a human body image are rich in features such as histogram features, color features, template features, structural features, and Haar features. Therefore, human body feature scanning analysis can be performed on the image to be identified, and the human body image in the image to be identified can be determined and then cropped from the image to be identified.

Figure 3:
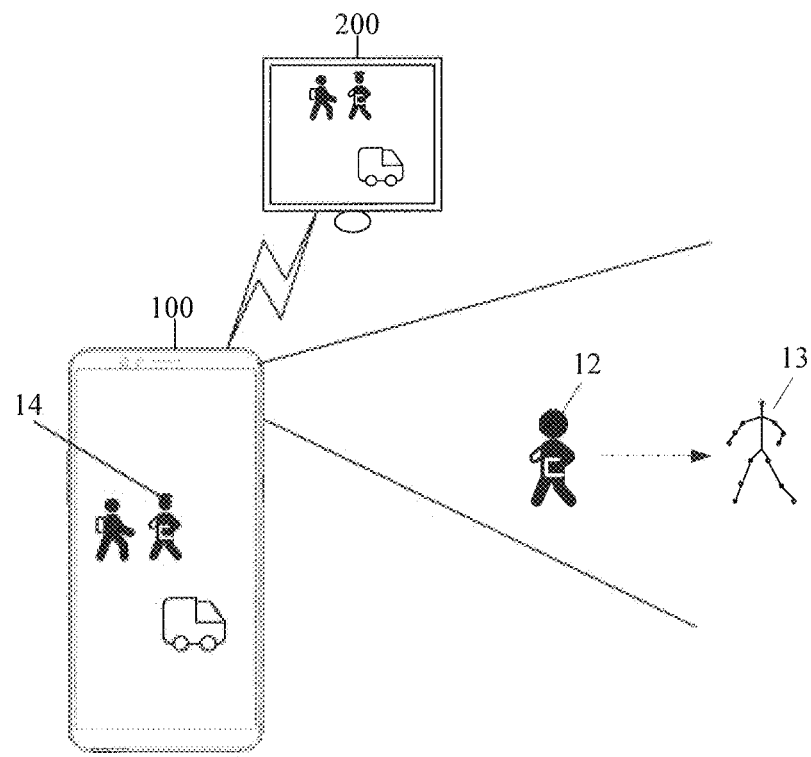
FIG. 3 is a schematic scenario diagram of n image processing method according to an embodiment of the present application.

As shown in FIG. 3, the electronic device 100 acquires, through a rear camera, an image to be identified. The image to be identified includes a user 12, and the electronic device 100 performs human body analysis on the image to be identified, and determines and crops a human body image corresponding to the user 12.

In operation S203, lines and contours in the human body image are scanned by the preset learning model to obtain the image elements.

Lines and contours in the human body image may be scanned by a mobilenet-Openpose model to obtain the image elements. As shown in FIG. 3, the image elements may be feature point information formed by each joint and each object part in the human body image corresponding to the user 12, such as head feature point information and handbag feature point information of the human body image corresponding to the user 12.

In operation S204, feature analysis is performed on the image elements to identify the human body feature point information in the human body image.

Since the mobilenet-Openpose model is a model for identifying human feature point information, after further feature analysis and comparison on the image elements, multiple pieces of feature point information in the human body image can be identified.

As shown in FIG. 3, the electronic device 100 analyzes and compares the joint feature point information and the handbag feature point information of the human body image corresponding to the user 12 to identify feature point information at one or more of the following positions: head, neck, left shoulder, left elbow, left wrist, left waist, left knee, left ankle, right shoulder, right elbow, right wrist, right waist, right knee, and right ankle on the human body image corresponding to the user 12.

In operation S205, the human body feature point information is sequentially connected according to a preset human body construction rule to generate the human body model information.

The electronic device may sequentially connect the identified human body feature points according to the human body construction rule to form human body model information. The human body model information is human body skeleton information under a certain motion state, which can be used for real-time tracking of human body motion.

As shown in FIG. 3, the electronic device 100 sequentially connects feature point information at positions (including head, neck, left shoulder, left elbow, left wrist, left waist, left knee, left ankle, right shoulder, right elbow, right wrist, right waist, right knee, and right ankle) on the human body image corresponding to the user 12 according to a 3D matchstick men construction rule to generate the human body model information 13 (which may be embodied as 3D matchstick men model information). The human body model information 13 can reflect motion state information of the user 12, including motion state information of the brain, body, hands and legs.

In operation S206, position information corresponding to at least one human body part in the human body model information is acquired, and a virtual object is correspondingly controlled according to the human body model information.

The virtual object may be modeled in advance. The modeling principle of the virtual object is the same as the human body construction rule of the human body model information. Position information of each human body part at the corresponding motion state is acquired from the human body model information, a corresponding motion posture is determined according to the position information, and the virtual object is controlled to simulate the corresponding motion posture to achieve real-time human-computer interaction.

As shown in FIG. 3, the electronic device 100 determines motion posture angles of the brain, body, hands and legs of the 3D matchstick men model information 13 according to the position information of the brain, body, hands and legs of the 3D matchstick men model information 13, and controls the virtual object 14 to make the same motion posture angles according to the motion posture angles to achieve motion sensing control.

In operation S207, target image information displayed currently by a display screen is acquired, and the target image information is transmitted to a third-party display device.

The electronic device may acquire target image information currently displayed by the display screen in real time. The target image information may be a game picture including a virtual object. The target image information is transmitted to a third-party display device, where the third-party display device may be a terminal having a display function, such as a television or a projector, such that the third-party display device can display the target image information in real time.

As shown in FIG. 3, the electronic device 100 transmits target image information including the virtual object 14 to a third-party display device 200 through a network. The third-party display device 200 displays the received target image information in real time. By virtue of the method, a body sensing experience based on a two-screen integrated technology can be achieved by conducting control at the electronic device 100 while viewing on the third-party display device 200.

It can be seen from the above that according to the image processing method provided by the embodiments, an image to be identified is acquired by a camera assembly, a human body image is cropped from the image to be identified, lines and contours in the human body image are scanned by the preset learning model to identify human body feature point information corresponding to the human body image, the human body feature point information is sequentially connected according to a preset human body structure rule to generate the human body model information, position information corresponding to at least one human body part in the human body model information is acquired to control various parts of a virtual object, and target image information displayed currently is transmitted to a third-party display device for real-time display. In this way, human body feature point information in a human body image can be identified in real time, the identified human body feature point information is combined to generate human body model information, and a virtual object is correspondingly controlled according to the state of at least one human body part in the generated human body model information. The cost of human-computer interaction is saved, and the convenience of human-computer interaction is improved.

In order to facilitate the implementation of the image processing method provided by the embodiments of the present application, an embodiment of the present application provides an apparatus based on the image processing method described above. The meaning of the terms is the same as that in the above image processing method. For implementation details, reference may be made to the description in the method embodiments.

Figure 4:
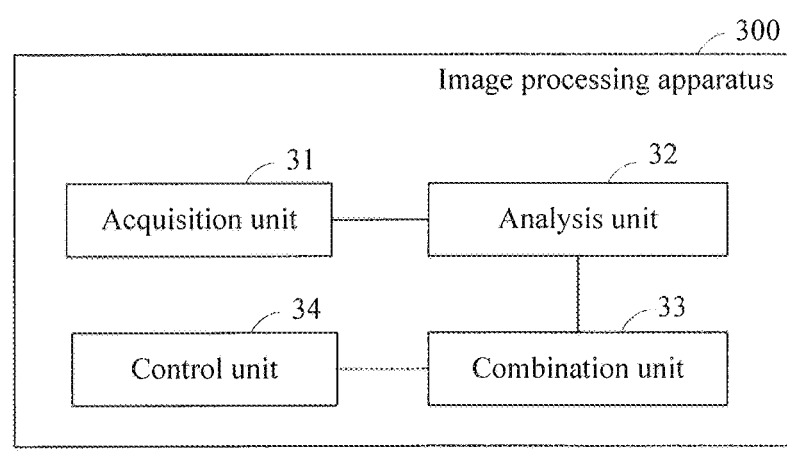
FIG. 4 is a schematic diagram showing modules contained in an image processing apparatus according to an embodiment of the present application.

Referring to FIG. 4, FIG. 4 is a schematic diagram showing modules contained in an image processing apparatus according to an embodiment of the present application. The image processing apparatus 300 includes an acquisition unit 31, an analysis unit 32, a combination unit 33 and a control unit 34.

The acquisition unit 31 is configured to acquire a human body image.

The acquisition unit 31 may capture a current image in real time by calling a camera assembly, and perform contour analysis on the current image. Since a human body generally has multiple contour information, such as face contour information and joint contour information, multiple pieces of contour information can be identified. Based on the combination of the multiple pieces of contour information, a human body image in the current image can be determined and cropped from the current image.

It should be noted that the current image and the human body image may be in a format such as a BMP, a JPEG, or the like.

In some implementation modes, the acquisition unit 31 is configured to: acquire, by a camera assembly, an image to be identified, wherein the camera assembly includes a front camera and/or a rear camera; and perform human body analysis on the image to be identified to obtain the human body image in the image to be identified.

The analysis unit 32 is configured to analyze the human body image to identify human body feature point information corresponding to the human body image.

The lines and contours of the human body image may be scanned and analyzed by the analysis unit 32, multiple feature points with certain features are determined, feature point similarity matching is performed on the feature points and the human body feature point information, and the feature points for which the feature point similarity is higher than a certain threshold are determined as the corresponding human body feature point information.

In some implementation modes, the analysis unit 32 is configured to analyze image elements in the human body image by a preset learning model to identify the human body feature point information in the human body image.

In some implementation modes, the analysis unit 32 is configured to scan lines and contours in the human body image by the preset learning model to obtain the image elements, and perform feature analysis on the image elements to identify the human body feature point information in the human body image, wherein the human body feature point information includes feature point information at one or more of the following positions: head, neck, left shoulder, left elbow, left wrist, left waist, left knee, left ankle, right shoulder, right elbow, right wrist, right waist, right knee, and right ankle.

The combination unit 33 is configured to combine the human body feature point information to generate human body model information.

The human body model information is a human body skeleton model. The human body model information, i.e., human body skeleton information, can be obtained by sequentially connecting the identified human body feature information according to a basic human body construction rule. The human body model information reflects a body gesture of the photographed user. In an implementation mode, the human body model information may be a 3D matchstick men model. The 3D matchstick men model can reflect the body posture of the user.

In some implementation modes, the combination unit 33 is configured to sequentially connect the human body feature point information according to a preset human body construction rule to generate the human body model information.

The control unit 34 is configured to correspondingly control a virtual object according to the human body model information.

The virtual object may be a fictitious character. The virtual object is modeled also according to a construction rule of the human body model information, that is, the virtual object may have a mutual correspondence with the human body feature point information corresponding to the human body model information. The virtual object may be a character in a game application.

Further, the control unit 34 may track the body parts of the human body model information, for example, the control unit 34 may track the posture angles of the head, the body, the hands and the feet, to determine the corresponding motion posture, such as squatting, jumping, or waving. The virtual object is controlled to make a corresponding action according to the determined motion posture.

In some implementation modes, the control unit 34 is configured to acquire position information corresponding to at least one human body part in the human body model information, and correspondingly control a virtual object according to the human body model information.

It can be seen from the above that according to the image processing apparatus provided by the embodiments, the acquisition unit 31 acquires a human body image; the analysis unit 32 analyzes the human body image to identify human body feature point information corresponding to the human body image; the combination unit 33 combines the human body feature point information to generate human body model information; and the control unit 34 correspondingly controls a virtual object according to the human body model information. In this way, human body feature point information in a human body image can be identified in real time, the identified human body feature point information is combined to generate human body model information, and a virtual object is correspondingly controlled according to the state of at least one human body part in the generated human body model information. The cost of human-computer interaction is saved, and the convenience of human-computer interaction is improved.

Figure 5:
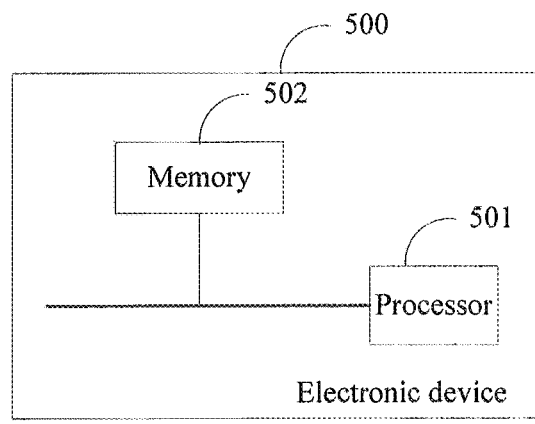
FIG. 5 is a schematic structure diagram of an electronic device according to an embodiment of the present application.

Another embodiment of the present application provides an electronic device. Referring to FIG. 5, the electronic device 500 includes a processor 501 and a memory 502. The processor 501 is electrically connected to the memory 502.

The processor 500 is a control center of the electronic device 500, and is configured to connect all parts of the entire electronic device by utilizing various interfaces and lines, to run or execute a computer program stored in the memory 502, and to call data stored in the memory 502 to execute various functions of the electronic device 500 and process data, so as to comprehensively monitor the electronic device 500.

The memory 502 may be configured to store software programs and software modules. The processor 501 executes various function applications and performs data processing by running the computer programs and the modules stored in the memory 502. The memory 502 may mainly include a program storage area and a data storage area. The program storage area may store an operating system, a computer program required for at least one function (such as a sound playing function and an image playing function). The data storage area may store data created according to the use of the electronic device. In addition, the memory 502 may include a high-speed RAM, and may further include a non-volatile memory such as a disk storage device, a flash device, or other non-volatile solid storage devices. Correspondingly, the memory 502 may further include a memory controller which provides access of the processor 501 to the memory 502.

In the embodiments of the present application, the processor 501 in the electronic device 500 loads instructions corresponding to the process of one or more computer programs into the memory 502 according to the following operations, and the processor 501 runs the computer program stored in the memory 502, thereby implementing various functions as follows:

A human body image is acquired.

The human body image is analyzed to identify human body feature point information corresponding to the human body image.

The human body feature point information is combined to generate human body model information.

A virtual object is correspondingly controlled according to the human body model information.

In some implementation modes, when the human body image is analyzed to identify human body feature point information corresponding to the human body image, the processor 501 may perform the operations as follows.

Image elements in the human body image are analyzed by a preset learning model to identify the human body feature point information in the human body image.

In some implementation modes, when image elements in the human body image are analyzed by a preset learning model to identify the human body feature point information in the human body image, the processor 501 may perform the operations as follows.

Lines and contours in the human body image are scanned by the preset learning model to obtain the image elements.

Feature analysis is performed on the image elements to identify the human body feature point information in the human body image, wherein the human body feature point information includes feature point information at one or more of the following positions: head, neck, left shoulder, left elbow, left wrist, left waist, left knee, left ankle, right shoulder, right elbow, right wrist, right waist, right knee, and right ankle.

In some implementation modes, when the human body feature point information is combined to generate human body model information, the processor 501 may perform the following operations.

The human body feature point information is sequentially connected according to a preset human body construction rule to generate human body model information.

In some implementation modes, when an image of a human body is acquired, the processor 501 may perform the following operations.

An image to be identified is acquired by a camera assembly, wherein the camera assembly includes a front camera and/or a rear camera.

Human body analysis is performed on the image to be identified to obtain the human body image in the image to be identified.

In some implementation modes, the processor 501 may further perform the following operations.

Target image information displayed currently by a display screen is acquired.

The target image information is transmitted to a third-party display device, such that the third-party display device displays the target image information.

It can be seen from the above that according to the electronic device of the embodiments of the present application, a human body image is acquired; the human body image is analyzed to identify human body feature point information corresponding to the human body image; the human body feature point information is combined to generate human body model information; and a virtual object is correspondingly controlled according to the human body model information. In this way, human body feature point information in a human body image can be identified in real time, the identified human body feature point information is combined to generate human body model information, and a virtual object is correspondingly controlled according to the state of at least one human body part in the generated human body model information. The cost of human-computer interaction is saved, and the convenience of human-computer interaction is improved.

Figure 6:
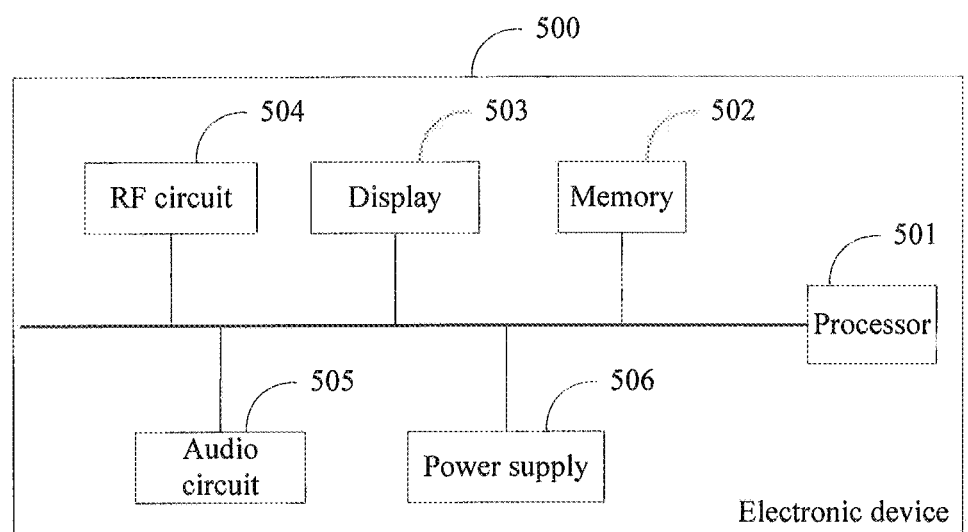
FIG. 6 is another schematic structure diagram of an electronic device according to an embodiment of the present application.

Referring to FIG. 6, in some implementation modes, the electronic device 500 may further include: a display 503, a radio frequency (RF) circuit 504, an audio circuit 505, and a power supply 506. The display 503, the radio frequency circuit 504, the audio circuit 505 and the power supply 506 are electrically connected to the processor 501, respectively.

The display 503 may be used to display information input by a user or information provided to the user and various graphical user interfaces that may be composed of graphics, text, icons, video, and any combination thereof. The display 503 may include a display panel. In some implementation modes, the display panel may be configured in a form of a Liquid Crystal Display (LCD), an Organic Light-Emitting Diode (OLED), etc.

The radio frequency circuit 504 may be used to transmit and receive radio frequency signals to establish wireless communication with network devices or other electronic devices through wireless communication, and to transmit and receive signals with network devices or other electronic devices.

The audio circuit 505 may be used to provide an audio interface between the user and the electronic device through a loudspeaker and a microphone.

The power supply 506 may be used to supply power to various components of the electronic device 500. In some embodiments, the power supply 506 may be connected to the processor 501 logically via a power supply management system, so as to implement functions of charging, discharging and power consumption management by means of the power supply management system.

Although not shown in FIG. 6, the electronic device 500 may further include a camera, a Bluetooth module, and the like, and details are not described herein.

The embodiment of the present application also provides a storage medium, having a computer program stored thereon. When the computer program is run on a computer, the computer is enabled to perform the image processing method in any of the above embodiments. For example, a human body image is acquired; the human body image is analyzed to identify human body feature point information corresponding to the human body image; the human body feature point information is combined to generate human body model information; and a virtual object is correspondingly controlled according to the human body model information.

In the embodiment of the present application, the storage medium may be a magnetic disk, an optical disk, a Read-Only Memory (ROM), or a Random Access Memory (RAM).

In the above embodiment, descriptions of each embodiment are emphasized respectively, and parts which are not elaborated in detail in a certain embodiment may refer to relevant descriptions of other embodiments.

It is to be noted that, for the image processing method in the embodiments of the present application, a common tester in the art can understand all or part of the flow of implementing the image processing method in the embodiments of the present application may be completed by controlling related hardware through a computer program. The computer program may be stored in a computer-readable storage medium, such as in a memory of the electronic device, and executed by at least one processor in the electronic device. The flow of the embodiments, for example, the image processing method may be included during execution. The storage medium may be a magnetic disk, an optical disk, a ROM, a RAM, etc.

For the image processing apparatus of the embodiments of the present application, each functional module may be integrated into one processing chip, or each module may exist physically separately, or two or more modules may be integrated into one module. The integrated module may be implemented in a hardware form and may also be implemented in form of software functional module. When being implemented in form of software functional module and sold or used as an independent product, the integrated module may be stored in a computer readable storage medium such as a ROM, a magnetic disk or an optical disk.

The above is a detailed description of the image processing method and apparatus, a storage medium and an electronic device provided by the embodiments of the present application. The principle and implementation modes of the present application are described in the specific examples herein. The description of the embodiments is only for providing assistance in understanding the method and the core ideas of the present application. Furthermore, for those skilled in the art, according to the idea of the present application, there will be changes in exemplary implementation modes and application scopes. In conclusion, the above description should not be taken as limiting the present application.

What is claimed is:

1. An image processing method, comprising:
   acquiring a human body image;
   analyzing the human body image to identify human body feature point information corresponding to the human body image;
   combining the human body feature point information to generate human body model information; and
   correspondingly controlling a virtual object according to the human body model information;
   acquiring target image information displayed currently by a display screen; and
   transmitting the target image information to a third-party display device, such that the third-party display device displays the target image information;
   wherein the image processing method is applied in an electronic device, and the electronic device comprises at least one of following: a smart phone, a tablet computer, a Personal Digital Assistant (PDA).

2. The image processing method as claimed in claim 1, wherein analyzing the human body image to identify the human body feature point information corresponding to the human body image comprises:
   analyzing image elements in the human body image by a preset learning model to identify the human body feature point information in the human body image.

3. The image processing method as claimed in claim 2, wherein analyzing the image elements in the human body image by the preset learning model to identify the human body feature point information in the human body image comprises:
   scanning lines and contours in the human body image by the preset learning model to obtain the image elements; and
   performing feature analysis on the image elements to identify the human body feature point information in the human body image.

4. The image processing method as claimed in claim 3, wherein the preset learning model is a mobilenet-Openpose model.

5. The image processing method as claimed in claim 1, wherein the human body feature point information comprises feature point information at one or more of the following positions: head, neck, left shoulder, left elbow, left wrist, left waist, left knee, left ankle, right shoulder, right elbow, right wrist, right waist, right knee, and right ankle.

6. The image processing method as claimed in claim 1, wherein combining the human body feature point information to generate the human body model information comprises:
   sequentially connecting the human body feature point information according to a preset human body construction rule to generate the human body model information.

7. The image processing method as claimed in claim 1, wherein the human body model information reflects a body gesture of a photographed user in the human body image.

8. The image processing method as claimed in claim 1, wherein acquiring the human body image comprises:
   acquiring, by a camera assembly, an image to be identified, wherein the camera assembly comprises a front camera and/or a rear camera; and
   performing human body analysis on the image to be identified to obtain the human body image in the image to be identified.

9. The image processing method as claimed in claim 1, wherein correspondingly controlling the virtual object according to the human body model information comprises:
   acquiring position information corresponding to at least one human body part in the human body model information; and
   correspondingly controlling the virtual object according to the position information.

10. The image processing method as claimed in claim 1, wherein the virtual object is modeled according to a construction rule of the human body model information, and has a mutual correspondence with the human body feature point information corresponding to the human body model information.

11. A storage medium, having a computer program stored thereon, wherein when the computer program is run on a computer, the computer is enabled to perform the image processing method as claimed in claim 1.

12. An electronic device, comprising a memory and a processor, the memory storing a computer program, wherein the processor is configured to call the computer program to implement the following operations:
    acquiring a human body image;
    analyzing the human body image to identify human body feature point information corresponding to the human body image;
    combining the human body feature point information to generate human body model information; and
    correspondingly controlling a virtual object according to the human body model information;
    acquiring target image information displayed currently by a display screen; and
    transmitting the target image information to a third-party display device, such that the third-party display device displays the target image information;
    wherein the electronic device comprises at least one of following: a smart phone, a tablet computer, a Personal Digital Assistant (PDA).

13. The electronic device as claimed in claim 12, wherein the processor is configured to call the computer program to implement the following operation:
    analyzing image elements in the human body image by a preset learning model to identify the human body feature point information in the human body image.

14. The electronic device as claimed in claim 13, wherein the processor is configured to call the computer program to implement the following operations:
    scanning lines and contours in the human body image by the preset learning model to obtain the image elements; and
    performing feature analysis on the image elements to identify the human body feature point information in the human body image.

15. The electronic device as claimed in claim 12, wherein the processor is configured to call the computer program to implement the following operation:
    sequentially connecting the human body feature point information according to a preset human body construction rule to generate the human body model information.

16. The electronic device as claimed in claim 12, further comprising a camera assembly, wherein
the camera assembly is configured to acquire an image to be identified, wherein the camera assembly comprises a front camera and/or a rear camera; and
the processor is configured to call the computer program to implement the following operation: performing human body analysis on the image to be identified to obtain the human body image in the image to be identified.

17. The electronic device as claimed in claim 12, wherein the processor is configured to call the computer program to implement the following operations:
acquiring position information corresponding to at least one human body part in the human body model information; and
correspondingly controlling the virtual object according to the position information.

18. The electronic device as claimed in claim 12, wherein the virtual object is modeled according to a construction rule of the human body model information, and has a mutual correspondence with the human body feature point information corresponding to the human body model information.

* * * * *